3,339,139
APPARATUS FOR FOURIER ANALYZING, NORMALIZING AND DETERMINING TIME-PHASE COINCIDENCE BETWEEN SIGNALS
Milford R. Lee, Douglas S. Sullivan, and George D. Harney, Ponca City, Okla., and William Earl Neal Doty, Needham Heights, Mass., assignors to Continental Oil Company, Ponca City, Okla., a corporation of Delaware
Filed Feb. 19, 1963, Ser. No. 259,526
6 Claims. (Cl. 324—77)

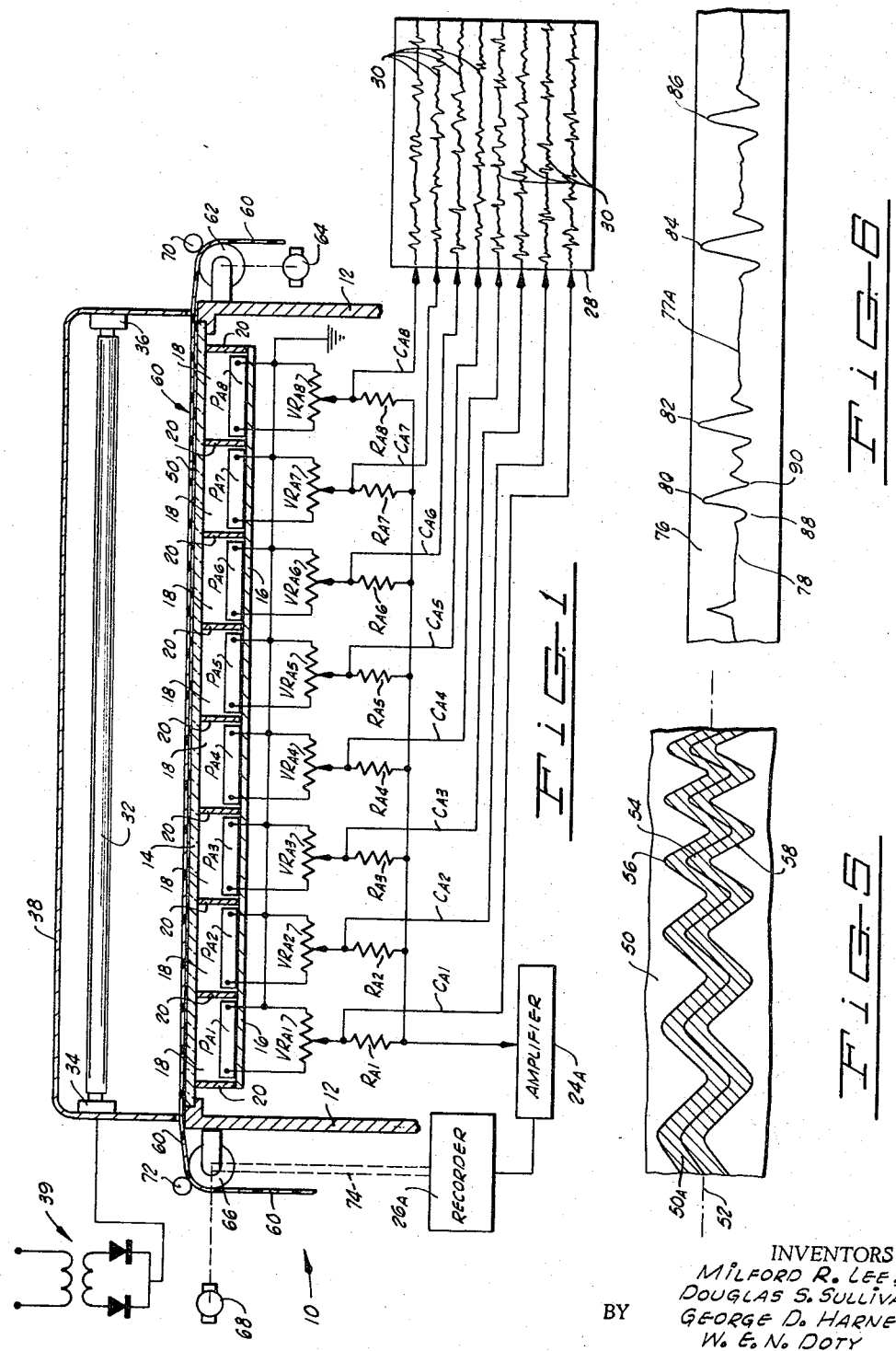

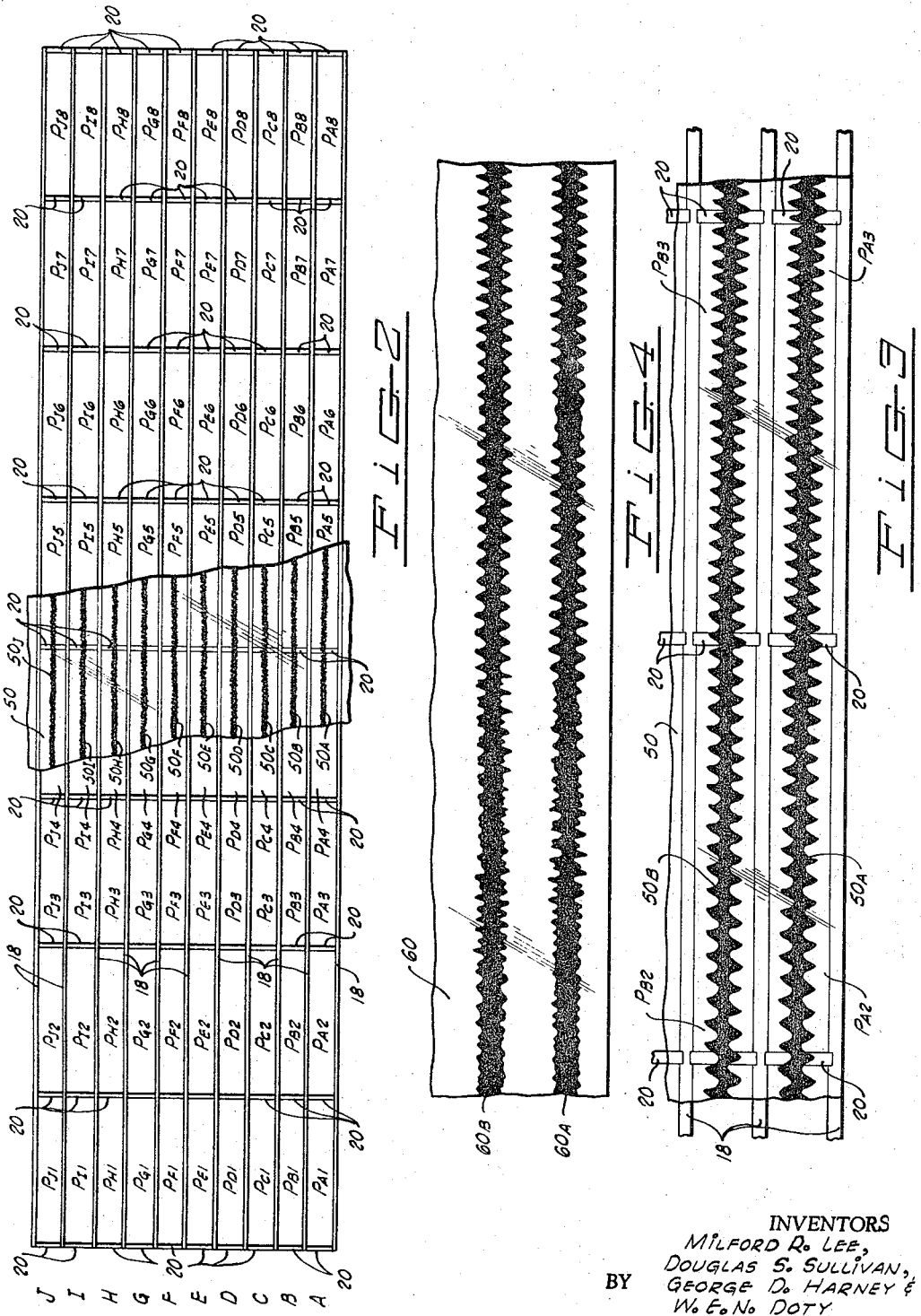

The present invention relates generally to the art of analyzing signals which vary in magnitude with respect to time, and more particularly, but not by way of limitation, relates to method and apparatus for making a Fourier analysis of a complex signal, for shaping the frequency spectrum of the complex signal, and for more accurately determining the time-phase coincidence between the complex signal and another signal, the other signal usually having a predetermined frequency content.

The present invention is also an improvement over the method and apparatus for solving the time-phase coincidence problem between a seismic signal of known frequency content transmitted from one point through the earth along a plurality of paths and the resulting complex seismic signal recorded at another point as described in copending U.S. patent application Ser. No. 812,289 filed by Doty et al. on May 11, 1959, now Patent No. 3,127,508, and assigned to the assignee of the present invention.

In geophysical prospecting a seismic signal is generated at or near the surface of the earth and propagates in all directions from the generation point. A portion of the seismic signal travels primarily in the surface layers of the earth and arrives in a relatively short time at a nest of geophones placed on the surface of the earth at a distant point. The seismic signal also propagates downwardly and as it passes through various surfaces of discontinuity or interfaces, a portion of the seismic energy is reflected back to the surface and is recorded by the geophones at a later time, dependent of course upon the length of the path followed by the particular signal. The period of time required for the seismic waves to travel downwardly and be reflected back to the surface provide valuable information concerning the depth and position of the interfaces between the sedimentary strata of the earth.

For many years the seismic signal was generated by an explosive blast and therefore had a substantially instantaneous high-peak energy content with a large amount of random noise. However, in more recent times, improved methods of geophysical surveying have been developed which utilize a seismic signal of relatively low energy level, but having a controlled frequency content and a relatively long duration. An example of the latter type of seismic signal and the methods of prospecting using the same, are described in U.S. Patent No. 2,688,124, issued to Doty et al. on Aug. 31, 1954, and assigned to the assignee of the present invention. The seismic signal used in this method is conveniently generated by a hydraulically powered transducer and persists for several seconds over which period of time the signal varies uniformly between a low frequency of approximately 10 c.p.s. and a high frequency as great as 100 c.p.s. The frequency content of the seismic signal is precisely controlled by appropriate phase control circuitry which governs the operation of the mechanical transducer. The seismic signal may vary between 10 and 100 c.p.s., in which case it is referred to by workers in the art as an upsweep, or the signal may be a downsweep from the higher frequency to the lower. Of course, it will be appreciated that substantially any long duration signal having substantially any controlled frequency content can be utilized.

When a long duration sweep signal is transmitted, the entire sweep will be reflected at each subsurface interface. Since the total time required for the signal to travel downwardly to even the deeper interfaces and return to the surface is less than the several seconds duration of the sweep signal, the reflected sweep signals which travel over the various paths will not be separated in time, but rather will overlap such that the signal detected by the geophones and recorded by appropriate equipment will be very complex.

As described in the above-referenced application Ser. No. 812,289, the time required for the seismic signal to travel to each interface and be reflected to the surface can be accurately determined merely by determining the time at which the sweep signal coincides with, or is in phase with the complex recording of the signal. In the referenced application this is accomplished by recording both the sweep signal and the recorded complex signal as substantially opaque traces upon transparent film, the traces having the same approximate width and the same time scale. One of the traces, usually the sweep signal trace, is held stationary between a light source and a light detection means, such as a photocell, and the other trace, usually the complex recording signal, is then moved longitudinally over the sweep signal trace. The amount of light passing through the two superimposed traces is detected by the photocell and recorded by suitable means. So long as there is virtually no phase coincidence between the two signals, the output from the photocells will be at a substantially constant intermediate level. However, as a point on the complex recording signal is approached where the two signals are in coincidence, the output from the photocell will first go to a minimum value when the two signals are approximately 180° out-of-phase, then go to a high maximum as the two signals are precisely in phase, and then swing back to the minimum value as the signals once again pass 180° out-of-phase before returning to the intermediate level. The process of determining the time-phase coincidence of the two signals is known by workers in the art as "correlation."

Generally speaking, the method and apparatus described in the referenced U.S. application function well so long as perfect conditions exist. That is, so long as a relatively wide band frequency signal having a substantially uniform magnitude or level of energy over the entire frequency spectrum is being correlated, the seismic event indicated by the decline, rise and decline of the output signal of the photocell is relatively sharp and covers only a short time interval. However, when the amplitude of either the lower frequency bands or the higher frequency bands of the complex signal is attenuated, these indications tend to spread over a greater time period so that two events close in time will overlap and interfere. Therefore, it is highly desirable that the amplitude of each of the frequency bands of the entire frequency spectrum be approximately equal. However, in actual practice, some bands of the frequency spectrum are invariably attenuated to some degree. Attenuation of the signal may result from any one of several causes. For example, the overlapping sweep signals which make up the recorded complex signal sometimes interfere with each other in such a manner that some frequency bands are canceled or attenuated while other bands reinforce. Further, in most cases, the deeper formations and distance traveled tend to attenuate the higher frequency bands of the sweep signal considerably more than the lower frequency bands. This general problem is complicated even further in that various types of formations will tend to attenuate different bands of the frequency spectrum, and each band will be attenuated to a different degree. Therefore, the amount of attenuation and reinforcement of the various frequency bands which will occur cannot be accurately predicted before transmission of the seismic signal so that compensations made in the transmitted signal are not wholly effective. Heretofore it has not been possible to easily detect distortion of the signal after it is recorded due to the fact that the relative time positions of the reflecting events plays a large role in determining the degree of "crosstalk" or "interference" between two adjacent seismic events.

The present invention contemplates a novel method and apparatus for making a Fourier analysis of any complex signal to determine the energy level of certain frequency bands within the frequency spectrum of the signal. The Fourier analysis can be made with respect to a particular stable frequency or with respect to a variable frequency or frequency band. The present invention also contemplates a novel and improved method and apparatus for determining the time-phase coincidence or correlation between any two signals, and is particularly useful in correlating a reference signal of known frequency content, such as the return signal of the seismic sweep signal recorded at a distant point on the surface of the earth.

In accordance with the present invention, two signals are recorded as substantially opaque traces on transparent film as previously described. One trace, usually the sweep signal trace having a frequency varying from 10 to 90 c.p.s., for example, is then held stationary between a light source and a plurality of means for detecting the intensity of light passing through separate segments of the sweep signal trace, each segment corresponding to a particular frequency band of interest. Then when the complex signal is moved relative to the sweep signal trace, the output signal from each of the light detectors will have a magnitude proportional to the energy level of the corresponding frequency band of the complex signal. The output from the various light detecting means may then be adjusted to the desired level and mixed to provide a balanced or "normalized," correlated time-phase output signal having relatively sharp indications representative of the time required for the seismic signal to travel downwardly to the various interfaces and return to the surface.

Therefore, it is an important object of the present invention to provide an improved method and apparatus for determining the time-phase coincidence between two signals, and in particular, for determining the time-phase coincidence between a transmitted seismic sweep signal and the recorded complex signal in order to establish the time required for a seismic signal to traverse various paths through the earth.

Another object of the present invention is to provide a simple method and apparatus for performing a Fourier analysis on any complex signal.

Many additional objects and advantages of the present invention will be evident to those skilled in the art from the following detailed description and drawings, wherein:

FIG. 1 is a schematic diagram of a device constructed in accordance with the present invention;

FIG. 2 is another schematic diagram of a portion of the device illustrated in FIG. 1;

FIG. 3 is an enlarged view of a portion of the device shown in FIG. 2 with a corresponding portion of a typical sweep signal trace operatively positioned thereon;

FIG. 4 is a drawing of a portion of a typical film strip having a pair of complex signal traces thereon which would be superimposed over the traces of FIG. 3;

FIG. 5 is an enlarged segment of a portion of a typical trace as shown in FIGS. 3 and 4 and serves to better illustrate the details of the trace; and, FIG. 6 is a schematic drawing of a typical recording produced by using the device of FIG. 1 in accordance with the method of the present invention.

Referring now to the drawings, and in particular to FIG. 1 and FIG. 2, a device constructed in accordance with the present invention is indicated generally by the reference numeral 10. The device 10 has a suitable cabinet 12 for containing and supporting the electrical circuitry and components which will hereafter be described. The cabinet 12 includes a support for at least one transparency which will hereafter be described. This support may conveniently be an elongated sheet of plate glass 14 or other suitable transparent member. The cabinet 12 also supports an elongated plate 16 below, and parallel to the glass plate 14. The plate 16 has an area substantially co-extensive with the glass plate 14 and is divided into a large number of elongated wells by longitudinally extending the baffles 18, which extend the entire length of the plate 16, and a plurality of much shorter, transverse baffles 20, which extend between each pair of longitudinal baffles 18 substantially as illustrated in FIG. 2. Both of the baffles 18 and 20 are of substantially the same vertical height and extend from the support plate 16 up to the plate glass sheet 14 so that each elongated compartment formed by the baffles and the supporting plate 16 is totally insulated from the other insofar as light radiation is concerned. Further, both sides of the baffles 18 and 20 are preferably silvered so that light radiation entering the respective chambers will be reflected rather than absorbed. If desired, the plate glass 14 can be eliminated and the upper ends of the baffles 18 and 20 used to support the transparency.

It will be noted that the various independent chambers formed by the baffles 18 and 20 are aligned transversely by the longitudinal baffles 18 so that ten separate rows of eight compartments each are formed. Each of these longitudinally extending rows of compartments form what will be termed a channel for convenience of discussion, and the channels are designated alphabetically from A through J as illustrated in FIG. 2. A suitable light sensing means may be either a photoelectric cell which generates a current proportional to the light impinging thereon, or a photo resistive cell, the resistance of which varies in proportion to the amount of light impinging upon the cell. However, in the embodiment illustrated, a plurality of photoelectric cells are utilized which generate current and are designated by the reference character P followed by the capital subscript corresponding to the particular channel and the numerical subscript corresponding to the chamber in which the particular photoelectric cell is located, the chambers being numbered from left to right when referring to FIG. 2. For example, as will be seen in FIG. 2, the photoelectric cells which comprise Channel A are designated $P_{A1}$ through $P_{A8}$. Similarly, the photoelectric cells of Channel B are designated $P_{B1}$ through $P_{B8}$.

Referring again to FIG. 1, only the circuit diagram for Channel A of the device 10 is illustrated. However, it is to be understood that a similar circuit diagram is provided for each of the other nine channels B–J. A variable resistor designated by the reference character VR and a subscript corresponding to that of the particular photoelectric cell is connected across the photoelectric cell substantially as illustrated. For example, a variable resistor $VR_{A1}$ is connected across the photoelectric cell $P_{A1}$, and a variable resistor $VR_{A2}$ is connected across the photoelectric cell $P_{A2}$, and so on for each of the eight photoelectric cells of Channel A. The sliding contact on each of the variable resistors VR is connected through a resistor, designated by the reference character R and subscript corresponding to that of the variable resistor VR with which it is associated, to an amplifier $24_A$ which mixes and amplifies the signals produced by the various photoelectric cells as hereafter described. The amplifier $24_A$ is then connected to the desired readout device such as a recorder $26_A$. It will be remembered that there are ten channels A through J and accordingly in actual practice there should be ten amplifier channels and ten recorder channels for producing a corresponding number of traces representative of the composite signal from each channel as will presently be described. Each sliding contact on each of the variable resistors VR is connected by a conductor designated by the reference character C with the appropriate subscript A1 through A8, to an eight channel oscilloscope 28. The oscilloscope 28 may be of any conventional design and displays the signals from the respective conductors C as separate synchronized traces 30.

A suitable light source is disposed above the plate glass sheet 14 and is preferably comprised of one or more fluorescent lamps 32 which extend parallel to the channels A through J and are approximately the same length. The fluorescent lamps 32 may be supported by suitable brackets 34 and 36 which are connected to a hood 38. The hood 38 is preferably hinged along one longitudinal edge to the cabinet 12. When lowered into the position shown, the hood 38 shields the plate glass sheet 14 and consequently the various photoelectric sensing elements from any light other than that emanating from the fluorescent lamps 32. The lamps 32 are preferably illuminated by a D.C. electric power source such as a rectifier 39 connected across any available source of A.C. current. The intensity of the light radiating from the lamps will then be steady state rather than pulsating at 20 c.p.s. which approaches the frequency of the signals being analyzed and would tend to interfere with the operation of the device in a manner evident to those skilled in the art.

A transparent sheet of film 50 is substantially coextensive with and overlays the plate glass sheet 14 as illustrated in FIG. 1. A transverse segment of the film 50 is shown in FIG. 2. Ten substantially opaque traces $50_A$ through $50_J$ are printed on the transparent film strip 50 and are disposed over the corresponding channels A through J substantially as shown in FIG. 2. Each of the traces $50_A$ extends the entire length of each of the channels and therefore overlays all eight chambers of each channel. Each of the individual traces $50_A$–$50_J$ has a character as best seen in the enlarged view of FIG. 5 wherein it will be noted that the trace $50_A$, for example, has a substantially constant transverse width at least as great as the maximum excursion of the trace from an imaginary longitudinally extending center line 52, and that the distance of the instantaneous center 54 of the trace from the center line 52 is representative of the instantaneous magnitude and polarity of the signal. It will also be noted that due to its width compared to the maximum excursions, the lateral boundaries 56 and 58 of the trace never cross the imaginary center line 52.

As previously mentioned, the most customary type of signal used for seismographic surveying purposes comprises an upsweep from approximately 10 to approximately 90 c.p.s. Accordingly, when using the device 10 for determining the time-phase coincidence of the transmitted signal and the received signal, each of the traces $50_A$–$50_J$ varies at a uniform rate from 10 to 90 c.p.s. over its length. Therefore, if the eight compartments of each channel are of the same length, a 10 c.p.s. band will be positioned over each of the chambers. For example, the portion of each of the sweeps $50_A$–$50_J$ overlaying the first transversely aligned set of photoelectric cells $P_{A1}$–$P_{J1}$, respectively, will vary uniformly from 10 to 20 c.p.s. Similarly, the portions of the traces $50_A$–$50_J$ overlaying the second row of light sensing photoelectric cells $P_{A2}$–$P_{J2}$, respectively, will vary uniformly from 20 to 30 c.p.s.

The film 60 is of substantially the same width as the film 50, but normally will be of considerably greater length for purposes presently to be described. The film 60 passes over a roller 62, which may be driven by a motor 64 through a suitable gear mechanism, then extends longitudinally over the first film 50 and over a second roller 66, which may be driven by a second motor 68. A pair of idler rollers 70 and 72 may be provided to bias the film 60 against the drive rollers 62 and 66 to insure positive traction. The drive roller 66 is synchronized with the recorder 26 by any suitable means represented by the dotted shaft 74. Conventional control circuitry (not illustrated) is provided to operate the motors 64 and 68 in two different modes, as will hereafter be described in greater detail.

The film strip 60 also has ten opaque traces, $60_A$–$60_J$, of the same character as the traces $50_A$–$50_J$, i.e., of the same width and having the same longitudinal time scale. However, the ten traces $60_A$–$60_J$ each represent a complex signal recorded by a geophone which, in practice, will normally have been recorded by ten spaced geophones during the generation of a single set of seismic sweep signals which are later composited to produce a single trace. Each of the complex seismic traces $60_A$–$60_J$ is so positioned on the film strip 60 as to be aligned with the respective traces $50_A$–$50_J$ and therefore with the corresponding photocells of the channels A–J. Also, as previously mentioned, the film strip 60 may be of substantially any length because in the normal seismographic procedure, a series of shots are made at spaced points, usually along a straight line, while the geophones are held stationary and the resulting complex signals recorded sequentially by a suitable magnetic recorder. The magnetically recorded signals are then sequentially reproduced and recorded end to end on the film strip 60. This provides a series of traces from substantially the same formation which can then be correlated during a single pass of the film strip 60, as will presently be described.

Referring now to FIG. 6, a portion of a strip of record tape produced by the recorder 26 is indicated generally by the reference numeral 76. The tape 76 has an ink or other suitable trace $77_A$ thereon which is representative of the magnitude of the composite of all signals from the photocells $P_{A1}$–$P_{A8}$ of Channel A. As previously mentioned, the recorder 26 has ten channels such that ten traces will normally be produced simultaneously, each trace being representative of the composite signals from the eight photocells of the respective channels A–J.

When using the device 10 for seismograph purposes, the film strip 60 is first prepared by recording the composite signals received by ten spaced nests of geophones during a single "shot" or transmission of the seismic sweep signal to produce the ten traces $60_A$–$60_J$. The film strip 60 is placed over the film strip 50 having the ten traces $50_A$–$50_J$, each of which is representative of the sweep signal transmitted to produce the complex signals. The motors 64 and 68 are then operated to move the film strip 60 longitudinally until the portions of the traces $60_A$–$60_J$ which are of interest are disposed to pass over the traces $50_A$–$50_J$. With the output from the various photocells P of a single channel, Channel A for example, connected to the multi-trace oscilloscope 28, the trace 60 is moved longitudinally, for example from right to left when referring to FIG. 1, over the film strip 50. The output signal from each of the photocells $P_{A1}$–$P_{A8}$ will be displayed by the oscilloscope 28 as individual traces. Of course, operation of the oscilloscope 28 is synchronized with movement of the film strip 60 by suitable conventional means so that the traces 30 will be properly oriented to a time scale corresponding to that of the traces on the film strips 50 and 60. Further, each of the separate channels A–J is provided with suitable switching circuitry so that each photoelectric cell of each channel may be individually connected to the oscilloscope 28.

Suitable conventional circuitry is also provided for controlling the motors 64 and 68 so that the film strip 60 can be moved longitudinally to any desired position, and the control circuitry preferably includes suitable limit switches and current reversing circuitry for automatically reciprocating the film strip 60 a distance corresponding to the time scale length of the traces 30 on the oscilloscope 28. Then when the device is set on this mode of operation, the same portion of the film strip 60 will repeatedly be moved over the film strip 50. When the film strip 60 is moved forward over the film strip 50, each of the photoelectric cells $P_{A1}$–$P_{A8}$ will produce a signal having an instantaneous magnitude corresponding to the amount of light passing through the film strips, and accordingly each chamber functions as a band pass filter for the frequency band corresponding to the range of frequencies of the trace $50_A$ which is positioned over the particular chamber. For example, the amplitude about a median value of the output signal from the photoelectric cell $P_{A1}$ will be representative of the amplitude of the frequencies in the band between 10 and 20 c.p.s. of the trace $60_A$. Thus, if a segment of the trace $60_A$ has no frequency components in the frequency band from 10 to 20 c.p.s., the output of the photoelectric cell $P_{A1}$ will be at an average value which when fed to the oscilloscope 28 will serve as the zero value of an A.C. signal. However, as the amplitude of the frequencies within the band from 10 to 20 c.p.s. increases, the amplitude of the output signal from the photoelectric cell $P_{A1}$ will also increase. Each of the photoelectric cells $P_{A1}$–$P_{A8}$ of Channel A similarly filters out and provides a visual indication of the amplitude of the frequencies for the respective bands within the composite signal of the trace $60_A$. In other words, each trace 50 in combination with the light source 32, the overlaying trace 60 and the photoelectric cells functions as a series of filters which perform a Fourier analysis and determine the amplitude of the frequency within each band of the frequency spectrum of the composite signal 60.

After the device 10 is set up by placement of the film strip 50 over the plate glass sheet 14 and threading of the film strip 60 over the rollers 62 and 66, the film strip 60 is moved until the zone of interest is positioned at the right hand end of photoelectric cell $P_{A8}$. The oscilloscope 28 is switched to Channel A and the drive motors 64 and 68 are switched to the oscillating mode so that the film strip 60 will be repeatedly moved from right to left a distance corresponding to the time scale available on the oscilloscope 28. Each time the film strip 60 is moved from right to left the amplitude of the signal from each of the photoelectric cells will be traced on the respective channels of the oscilloscope 28. Next the variable resistors $VR_{A1}$–$VR_{A8}$ are manually adjusted until the amplitudes of the eight traces on the oscilloscope 28 are substantially equal. Then the signal collected from the resistors $R_{A1}$–$R_{A8}$ and fed to the amplifier channel $24_A$ and recorder channel $26_A$ will be balanced or in other words, will be substantially the same as if all frequencies of the complex trace $60_A$ were of the same amplitude. The oscilloscope 28 may then be switched to each of the successive channels B–J and the balancing procedure repeated so that all ten channels will be properly adjusted to produce balanced readout signals, which are collected and fed to the corresponding channels of the amplifier 24 and recorder 26. After all ten channels A–J are balanced, the multi-channel amplifier 24 and multi-channel recorder 26 are then actuated and the film strip 60 moved continuously from right to left across the film strip 50 to continuously record ten separate traces on the record strip 76, each of the traces being similar in appearance to the trace $77_A$ of FIG. 6. Although it may appear to be a painstaking task to adjust the eight variable resistors VR, it will be appreciated that the geological formations from which a great number of complex traces are recorded will be substantially the same so that further adjustment will not be necessary until it is desired to process data from a different locality. The operator can continuously monitor the correlation operations on the oscilloscope 28 and make any necessary minor adjustments of the variable resistors VR as they become necessary.

It will be noted that the trace $77_A$ has an average value represented by the generally flat portion 78 and has rather sharp seismic events 80, 82, 84 and 86. On either side of the peak events, for example event 80, it will be noted that the trace has sharp declines or negative portions 88 and 90. The value 80 occurs when the complex trace $60_A$ is in phase with the sweep signal trace $50_A$, and the low values 88 and 90 occur when the two signals are 180° out-of-phase. The shortness or time duration of the total event, for example event 80, including the depressions 88 and 90, is determined by the frequency spectrum of the sweep signal trace $50_A$. Theoretically, if the sweep signal trace $50_A$ had an infinite band width, the total event 80 would occupy a zero time period. Thus it will be evident that when a portion of the frequency spectrum is eliminated or attenuated, either at the higher or lower frequency bands, the time duration of the event will be prolonged in each direction and not only tend to prevent proper identification, but also have a greater tendency to overlap with an event close in time, such as the event 82.

Thus it will be evident that the present invention has described a method and apparatus whereby the frequency spectrum of the complex signal recorded by a geophone can be analyzed and then balanced or "normalized" so that a trace plotting the degree of coincidence between the recorded complex signal and the transmitted sweep signal will have sharper "in phases" or seismic event indications. This will provide more accurate and more easily interpreted time data. It will also be evident that a means for making a Fourier analysis of any complex signal has been described.

Although a particular embodiment of the present invention has been described, it will be evident to those skilled in the art that any number of channels may be combined in the manner described above. It will also be evident that any number of photoelectric cells may be provided so that any number of frequency bands may be analyzed, and further, that by varying the frequency of the traces 50 positioned over the respective photoelectric cells, the particular frequency bands which are to be analyzed may also be varied. Therefore it is to be understood that although the present invention is particularly adapted for use in analyzing and processing seismographic surveying data, the method and apparatus herein described may be utilized to analyze any complex signal and to determine the degree of coincidence between any two signals.

Having thus described the preferred embodiments of the present invention in detail, it is to be understood that various changes, substitutions and alterations can be made therein without departing from the spirit and scope of the invention as defined by the appended claims.

What is claimed is:

1. A device for analyzing the frequency content of a first signal recorded as a contrasting trace on a first transparent member, the device comprising:

a second transparent member having a second signal recorded thereon as a similar, contrasting trace, the trace having at least two segments of diffeent frequency content;

a light source disposed on one side of the second transparent member; and at least two means disposed on the other side of the second transparent member and being aligned for measuring the intensity of light passing through each of the segments of different frequency content, whereby as the first transparent member is moved between the light source and the means for measuring the intensity of the light and relative to the second transparent member, the intensity of light passing through each of the segments will be indicative of the frequency content of the first signal which corresponds to the frequency content of the respective segments.

2. A device for analyzing the frequency content of a first signal recorded as a first contrasting trace on a first transparent member, and for determining the time-phase coincidence between the first signal and a second signal, the device comprising:

a second transparent member having recorded thereon a second contrasting trace representative of the second signal and of the same character as the first trace, the second trace having at least two segments of different frequency content;

a light source on one side of the second transparent member;

light sensing means on the other side of the second transparent member for producing an electrical signal proportional to the intensity of light passing through each of the segments of different frequency content;

circuit means connected to each of the light sensing means for adjusting the magnitude of the electrical signal produced by the respective light sensing means; and circuit means connected to the last mentioned circuit means for combining the adjusted electrical signals and producing a composite signal indicative of the time-phase coincidence between the first and second signals.

3. A device for analyzing the frequency content of a first signal recorded as a first contrasting trace on a first transparent member, and for determining the time-phase coincidence between the first signal and a second signal, the device comprising:

a second transparent member having recorded thereon a second contrasting trace representative of the second signal and of the same character as the first trace, the second trace having at least two segments of different frequency content;

a light source on one side of the second transparent member;

light sensing means on the other side of the second transparent member for producing an electrical signal proportional to the intensity of light passing through each of the segments of different frequency content;

first circuit means connected to each of the light sensing means for adjusting the magnitude of the electrical signal produced by the respective light sensing means;

indicating means connected to each of the first circuit means for indicating the magnitude of the adjusted electrical signal;

second circuit means connected to each of the first circuit means for combining the adjusted electrical signals and producing a composite balanced signal indicative of the time-phase coincidence between the first and second signals; and, recording means connected to the second circuit means for recording the composite balanced signal.

4. A device for analyzing the frequency content of a first signal recorded as a first elongated contrasting trace on a first transparent member, the device comprising:

support means for supporting the second transparent member;

a light source disposed on one side of the support means for projecting light toward the support means;

a second transparent member having a second elongated contrasting trace recorded thereon, the second trace having at least two segments of different frequency content;

at least two light sensing means disposed on the other side of the support means for measuring the intensity of light passing from the light source through the respective segments of different frequency content when the second transparent member is supported by the support means; and, means for moving the first transparent member relative to the second transparent member when the second is supported by the support means, the first transparent member being moved longitudinally of the elongated traces with the elongated traces in superimposed relationship.

5. A device for analyzing the frequency content of a first signal recorded as a first elongated, contrasting trace on a first transparent member and for determining the time-phase coincidence between the first signal and a second signal recorded as a second elongated, contrasting trace on a second transparent member, the second trace having at least two segments of different frequency content, the device comprising:

support means for supporting the second transparent member;

a light source disposed above the support means for projecting light through the support means;

at least two light sensing cells disposed below the support means and oriented in a line for producing a signal indicative of the intensity of light striking the respective cells;

baffle means disposed around each of the light sensing cells for isolating the light passing through predetermined aligned segments of the support means so as to impinge only on the respective light sensing cells;

circuit means connected to each of the light sensing cells for indicating the magnitude of the signal produced by the respective cells; and, means for moving the first member relative to the support means in the direction in which the light sensing cells are aligned and with the first trace disposed between the light source and the light sensing cells.

6. A device for analyzing the frequency content of a first signal recorded as a first elongated, contrasting trace on a first transparent member and for determining the time-phase coincidence between the first signal and a second signal recorded as a second elongated, contrasting trace on a second transparent member, the second trace having at least two segments of different frequency content, the device comprising:

a plurality of light sensing cells for producing an electrical signal indicative of the intensity of light impinging thereon, the light sensing cells being aligned in at least one row, each row comprising a channel;

a light source spaced from each of the sensing cells for projecting light thereon;

light baffle means around each of the sensing cells and extending toward the light source for isolating light radiating from the light source toward the respective sensing cells;

first circuit means connected to each light sensing means for independently adjusting the amplitude of the electrical signals produced by each light sensing cell;

display means operatively connected to the first circuit means for visually displaying each adjusted electrical signal from the respective cells and first circuit means;

second circuit means connected to the first circuit means for summing the adjusted electrical signals from the first circuit means which are derived from the light sensing cells of each channel to produce a summation signal for each channel; and, recorder means connected to the second circuit means for recording each summation signal as a separate trace.

References Cited
UNITED STATES PATENTS

| | | | |
|---|---|---|---|
| 2,243,730 | 5/1941 | Ellis | 235—181 X |
| 2,638,402 | 5/1953 | Lee. | |
| 2,712,415 | 7/1955 | Piety | 235—181 X |
| 2,820,173 | 1/1958 | Raabe. | |
| 2,839,149 | 6/1958 | Piety | 235—181 X |
| 2,916,724 | 12/1959 | Peterson. | |
| 3,052,843 | 9/1962 | Hurvitz | 324—77 |
| 3,063,034 | 11/1962 | Lee | 235—181 X |
| 3,127,508 | 3/1964 | Doty et al. | 235—181 |

RUDOLPH V. ROLINEC, *Primary Examiner.*

A. E. RICHMOND, P. F. WILLE, *Assistant Examiners.*